(12) United States Patent
Schoeneberger (10) Patent No.: US 7,230,946 B2
(45) Date of Patent: Jun. 12, 2007

(54) REMOTE AGENT ACCESS METHOD TO A VOIP CONTACT CENTER WHERE HIGH QOS IS NOT SUPPORTED

(75) Inventor: Carl Schoeneberger, Dallas, TX (US)

(73) Assignee: Nuasis Corporation, San Jose, CA (US)

( * ) Notice: Subject to any disclaimer, the term of this patent is extended or adjusted under 35 U.S.C. 154(b) by 0 days.

(21) Appl. No.: 10/327,360

(22) Filed: Dec. 20, 2002

(65) Prior Publication Data
US 2004/0032863 A1   Feb. 19, 2004

Related U.S. Application Data

(60) Provisional application No. 60/404,076, filed on Aug. 16, 2002.

(51) Int. Cl.
*H04L 12/66* (2006.01)
(52) U.S. Cl. ............ 370/352; 370/401; 370/400; 370/493; 379/265.09; 379/265.08; 379/265.11
(58) Field of Classification Search ........ 370/351–356, 370/357, 401, 400, 493, 410; 379/265.02, 379/265.04, 265.06, 198, 219, 220.01, 221.01, 379/229, 265.09, 266.09, 265.08, 265.11, 379/265.1; 709/204, 218, 219, 203; 707/10
See application file for complete search history.

(56) References Cited

U.S. PATENT DOCUMENTS

| | | | |
|---|---|---|---|
| 5,282,243 A | 1/1994 | Dabbaghi et al. | 379/201 |
| 5,325,423 A | 6/1994 | Lewis | 379/90 |
| 5,390,295 A | 2/1995 | Bates et al. | 395/157 |
| 5,459,780 A * | 10/1995 | Sand | 379/266.09 |
| 5,488,411 A | 1/1996 | Lewis | 348/8 |
| 5,491,795 A | 2/1996 | Beaudet et al. | 395/159 |
| 5,612,730 A | 3/1997 | Lewis | 348/8 |

(Continued)

FOREIGN PATENT DOCUMENTS

EP   1 016 998 A2   5/2000

(Continued)

OTHER PUBLICATIONS

Dr. D. E. Brown, "The Interaction Center Platform™", Interactive Intelligence, Apr. 6, 2001, pp. 1 of 31.

(Continued)

*Primary Examiner*—Ajit Patel
*Assistant Examiner*—Chuong Ho
(74) *Attorney, Agent, or Firm*—Haverstock & Owens LLP (57) ABSTRACT

A system and method of providing remote agent access to a voice over internet protocol contact center by allowing an agent to login to the contact center with a data circuit through a remote data access device such as a VPN device are disclosed. The system and method further include, after receiving contact information, the contact center transmitting call data to the remote agent through the data line, the data line carrying bi-directional signaling data including the agent's ability to control call pick-up and hang-up, while transmitting the voice component over a telephone line. Further, the present invention has the ability to provide a continuous stream of customer calls to the agent or to disconnect after each individual call.

28 Claims, 4 Drawing Sheets

U.S. PATENT DOCUMENTS

| | | | |
|---|---|---|---|
| 5,613,068 A | 3/1997 | Gregg et al. | 395/200.13 |
| 5,835,126 A | 11/1998 | Lewis | 348/8 |
| 5,848,143 A * | 12/1998 | Andrews et al. | 370/352 |
| 5,903,642 A | 5/1999 | Schwartz et al. | 379/309 |
| 6,046,741 A | 4/2000 | Hochmuth | 345/348 |
| 6,046,762 A | 4/2000 | Sonesh et al. | 348/16 |
| 6,049,603 A | 4/2000 | Schwartz et al. | 379/309 |
| 6,094,479 A * | 7/2000 | Lindeberg et al. | 370/352 |
| 6,122,364 A * | 9/2000 | Petrunka et al. | 370/353 |
| 6,141,341 A | 10/2000 | Jones et al. | 370/352 |
| 6,188,673 B1 * | 2/2001 | Bauer et al. | 370/252 |
| 6,188,761 B1 | 2/2001 | Dickerman et al. | 379/265 |
| 6,201,804 B1 | 3/2001 | Kikinis | 370/352 |
| 6,212,565 B1 | 4/2001 | Gupta | 709/229 |
| 6,219,648 B1 | 4/2001 | Jones et al. | 705/8 |
| 6,225,998 B1 | 5/2001 | Okita et al. | 345/356 |
| 6,266,058 B1 | 7/2001 | Meyer | 345/339 |
| 6,301,480 B1 * | 10/2001 | Kennedy, III et al. | 455/445 |
| 6,330,326 B1 | 12/2001 | Whitt | 379/265.13 |
| 6,337,858 B1 | 1/2002 | Petty et al. | 370/356 |
| 6,366,577 B1 | 4/2002 | Donovan | 370/352 |
| 6,377,568 B1 | 4/2002 | Kelly | 370/352 |
| 6,400,804 B1 | 6/2002 | Bilder | 379/76 |
| 6,434,143 B1 | 8/2002 | Donovan | 370/356 |
| 6,445,695 B1 | 9/2002 | Christie, IV | 370/352 |
| 6,463,148 B1 | 10/2002 | Brady | 379/265.01 |
| 6,493,695 B1 | 12/2002 | Pickering et al. | 706/47 |
| 6,529,499 B1 | 3/2003 | Doshi et al. | 370/352 |
| 6,542,475 B1 * | 4/2003 | Bala et al. | 370/352 |
| 6,574,218 B1 | 6/2003 | Cooklev | 370/352 |
| 6,577,726 B1 * | 6/2003 | Huang et al. | 379/265.02 |
| 6,584,191 B1 | 6/2003 | McPartlan et al. | 379/265.02 |
| 6,590,596 B1 | 7/2003 | Rector | 345/810 |
| 6,600,735 B1 | 7/2003 | Iwama et al. | 370/352 |
| 6,611,590 B1 * | 8/2003 | Lu et al. | 379/265.09 |
| 6,614,902 B1 * | 9/2003 | Rizzetto | 379/265.11 |
| 6,639,982 B1 | 10/2003 | Stuart et al. | 379/266.03 |
| 6,665,395 B1 | 12/2003 | Busey et al. | 379/265.09 |
| 6,674,713 B1 | 1/2004 | Berg et al. | 370/217 |
| 6,678,265 B1 | 1/2004 | Kung et al. | 370/352 |
| 6,678,718 B1 * | 1/2004 | Khouri et al. | 709/204 |
| 6,687,251 B1 | 2/2004 | Mousseau et al. | 370/401 |
| 6,697,858 B1 | 2/2004 | Ezerzer et al. | 709/224 |
| 6,704,409 B1 | 3/2004 | Dilip et al. | 379/265.02 |
| 6,704,412 B1 * | 3/2004 | Harris et al. | 379/269 |
| 6,724,884 B2 | 4/2004 | Jensen et al. | 379/265.01 |
| 6,741,698 B1 | 5/2004 | Jensen | 379/265.02 |
| 6,766,377 B1 | 7/2004 | Grabelsky et al. | 709/238 |
| 6,771,765 B1 | 8/2004 | Crowther et al. | 379/265.09 |
| 6,778,494 B1 | 8/2004 | Mauger | 370/230 |
| 6,823,382 B2 | 11/2004 | Stone | 709/224 |
| 6,850,599 B2 | 2/2005 | Yoshitani | 379/37 |
| 6,850,613 B2 | 2/2005 | McPartlan et al. | 379/265.02 |
| 6,937,715 B2 | 8/2005 | Delaney | 379/265.09 |
| 7,035,252 B2 | 4/2006 | Cave et al. | 370/356 |
| 7,085,263 B1 | 8/2006 | Fitzgerald | 370/352 |
| 2001/0024997 A1 | 9/2001 | Sugano et al. | 477/2 |
| 2002/0071541 A1 * | 6/2002 | Cheung et al. | 379/215.01 |
| 2003/0018702 A1 | 1/2003 | Broughton et al. | 709/202 |
| 2003/0133558 A1 | 7/2003 | Kung et al. | 379/215.01 |
| 2003/0195753 A1 | 10/2003 | Homuth | 705/1 |
| 2004/0054743 A1 | 3/2004 | McPartlan et al. | 709/206 |
| 2004/0066923 A1 | 4/2004 | Robinson | 379/166 |
| 2004/0141508 A1 | 7/2004 | Schoeneberger et al. | 370/401 |
| 2004/0221053 A1 | 11/2004 | Codella et al. | 709/231 |

FOREIGN PATENT DOCUMENTS

| | | |
|---|---|---|
| WO | WO 99/65214 | 12/1999 |

OTHER PUBLICATIONS

M. Taylor, "Integrated Versus Unified CTI—What's the Difference?", Interactive Intelligence, http://www.inin.com/news/presscoverage/presscoverage.asp?id=14, Aug. 2, 2001, pp. 1 of 9.

CosmoCom, "CosmoCall Universe™ Technology Overview", http://www.cosmocom.com/Productinfo/techover.htm, Aug. 2, 2001, pp. 1 of 3.

"Declaration of Carl Schoeneberger", 2 pgs.

"Product Guide—Using SNMP to Manage Your Call Center More Efficiently", Aspect Communications Corporation, 2001, 16 pgs.

"*Message Classification in the Call Center*", by Stephan Busemann, Sven Schmeier, and Roman G. Arens. Published in Saarbrucken,Germany, pp. 158-165.

"*The Modernization of a Call Center*", by Karen Reasoner, University of Wyoming, Client Support Services, Information Technology, Laramie WY. 82070, pp. 270-273.

"*Redefining the Call Center: Customer Service on the Internet*", by D. Steul from San Francisco, Ca., pp. 38-42.

* cited by examiner

REMOTE AGENT ACCESS METHOD TO A VOIP CONTACT CENTER WHERE HIGH QOS IS NOT SUPPORTED

RELATED APPLICATION(S)

This Patent Application claims priority under 35 U.S.C. §119(e) of the co-pending, co-owned U.S. Provisional Patent Application Ser. No. 60/404,076, filed Aug. 16, 2002, and entitled "YOSEMITE ARCHITECTURE SPECIFICATION." The U.S. Provisional Patent Application Ser. No. 60/404,076, filed Aug. 16, 2002, and entitled "YOSEMITE ARCHITECTURE SPECIFICATION" is also hereby incorporated by reference in its entirety.

The co-pending, co-owned and co-filed U.S. patent application Ser. No. 10/327,348, filed Dec. 20, 2002, and entitled "SCHEDULED RETURN TO QUEUE WITH PRIORITY (SRQP)" is also hereby incorporated by reference in its entirety.

FIELD OF THE INVENTION

The present invention relates generally to the field of Contact Centers. More specifically, the present invention relates to the field of remote agent access to a Contact Center using a Voice over Internet Protocol (VoIP) network.

BACKGROUND OF THE INVENTION

When the underlying voice media of a Contact Center is VoIP, and an agent is to be operating from a remote location such as their home, it is still a requirement that the voice quality of the remote agent be comparable to a local agent in the center. With VoIP technology, this voice quality requires a data network to the remote location that has a managed Quality of Service (QoS) so that parameters such as latency and packet loss are low enough that the contact perceives the remote agent as being in the local Contact Center. Broadband data network connections to the residence or small outlying offices that can provide high QoS are not available at affordable prices and the necessary commercial data circuits that can provide QoS management typically are prohibitively expensive for a single or low number of uses.

Figure 1:
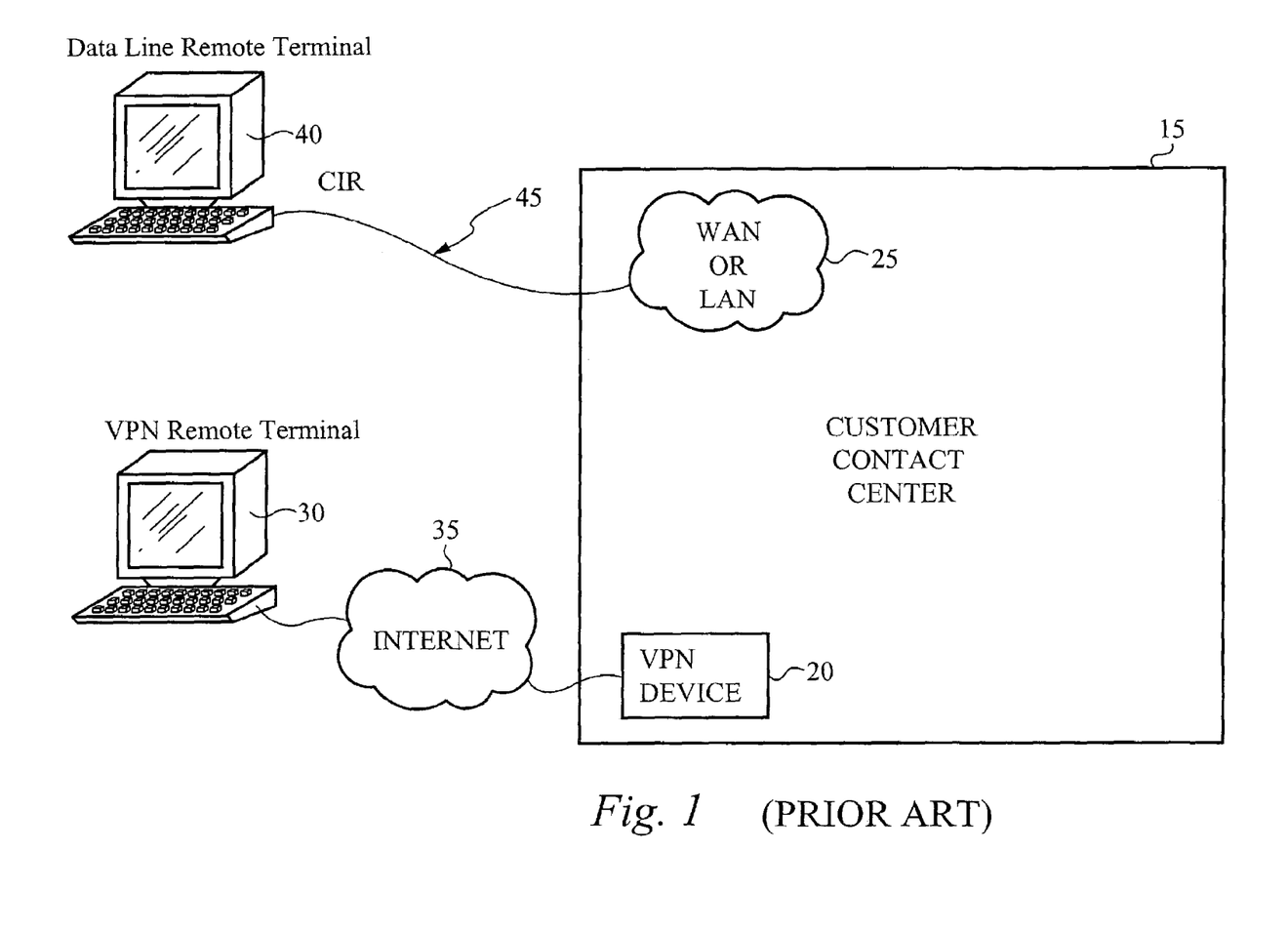
FIG. 1 illustrates a graphical representation of remote agent access to a Contact Center of the prior art.

Referring now to FIG. 1, in existing Contact Centers 15, it is necessary to allow agents to have remote access to the Contact Center 15 in the event that the agent needs to connect remotely. One such instance may be when the agent's office building is closed due to a bomb threat, bad weather or to support a work at home day. Remote agent access may also be desired when an agent is traveling, when an agent can not get into the office due to transportation problems, needs to be home with a sick child or when the agent's office building is closed due to a natural disaster. It could also be used to bring a few extra agents into service during peak Contact Center activity times.

The two most common prior art solutions for providing remote agent access to a Contact Center 15 are depicted in FIG. 1. The first includes a Remote Terminal 40 connected to the Wide Area Network (WAN) or Local Area Network (LAN) 25 of the Contact Center 15 through a frame relay connection with a committed minimum information rate (CIR) 45. Such a CIR connection 45 is available through public telephone companies. This "data line" approach provides an effective equivalent to a private communication line from the Remote Terminal 40 direct to the Contact Center 15, but is lower in cost because it need only connect to the carrier's nearest point of presence, as for both the "company" and the "remote access" end. When many companies share the carrier's backbone, this can allow remote networks to be built for less than dedicated circuits. Because the backbone is shared, the circuit ensures a minimum bandwidth will exist to support the application. The CIR 45, therefore, is not affected by large amounts of traffic as Internet solutions are, as the CIR 45 is a private "data line" from the Contact Center 15 to the Remote Terminal 40. However, such a "data line" solution is quite expensive, costing hundreds to over a thousand dollars a month.

Other architectures include a Remote Terminal 30 having Virtual Private Network (VPN) software installed so that the Remote Terminal 30 can be connected through the Internet 35, and to a VPN Device 20 in the Contact Center 15. Such a solution is inexpensive, as a high speed DSL or Cable connection typically cost about fifty dollars a month. However, because the Internet 35 is affected by variable bandwidth usage caused by high traffic, data packets containing the voice component may be delayed or even lost from the Remote Terminal 30 to the Contact Center 15. A DSL or Cable bandwidth is usually in the range of 100 kB or more, while encapsulated VoIP data can be up to 100 kb in size. However, there are often brief pauses in this available bandwidth that a typical user does not notice when looking at web pages or transferring files, but it would be very noticeable if the pauses interrupted speech each time it happened. This low voice quality is unacceptable as it may frustrate the customer as well as severely lower the efficiency of the remote agent.

What is needed is a remote agent access solution that includes the high QoS found in the Contact Center 15 with a reliable, fast and inexpensive high speed connection.

SUMMARY OF THE INVENTION

A system and method of providing remote agent access to a voice over internet protocol contact center by allowing an agent to login to the contact center with a data circuit through a remote data access device such as a VPN device are disclosed. The system and method further include, after receiving contact information, the contact center transmitting call data to the remote agent through the data line, the data line carrying bi-directional signaling data including the agent's ability to control call pick-up and hang-up, while transmitting the voice component over a telephone line. Further, the present invention has the ability to provide a continuous stream of customer calls to the agent or to disconnect after each individual call.

An embodiment of the present invention is a system for providing high quality of service remote access to a voice over internet protocol contact center comprising a contact center, wherein the contact center includes a remote data access device such as a VPN device, at least one gateway and at least one node coupled to the at least one gateway, a remote terminal coupled with the remote data access device through a data circuit and a remote telephone coupled with the gateway through a telephone circuit, wherein when an agent logs the remote terminal into the contact center, a voice component of a customer call is transmitted from the gateway to the remote telephone and a data component of the customer call is transmitted from the contact center to the remote terminal.

This embodiment of the present invention also includes when the remote terminal logs into the contact center, the remote terminal provides a phone number to direct the transmission of the voice component of the customer call from the at least one gateway to the remote telephone. The agent can respond to the customer call using the remote telephone and the remote terminal. The telephone circuit is a public switched telephone network. The data circuit can be a high speed internet connection or a high speed wireless internet connection.

The contact center of this embodiment also includes at least one hub coupled to the telephone circuit through the at least one gateway wherein the telephone circuit is a public switched telephone network, at least one network coupling the at least one node to the at least one hub and a plurality of agent terminals coupled to the at least one node. The at least one gateway receives the customer call from the public switched telephone network and distributes the customer call to one of the at least one nodes. The at least one node separates the voice component and the data component of the customer call, and further wherein the at least one node sends the voice component to the at least one gateway and the data component through the at least one network to the remote data access device. The at least one network can be a wide area network or a local area network.

A further embodiment of the present invention is a method of providing high quality of service remote access to a voice over internet protocol contact center comprising the steps of logging a remote terminal into a contact center through a data circuit, transmitting a voice component of a customer call from the contact center to a remote telephone through a telephone circuit, transmitting a data component of the customer call corresponding to the voice component, wherein the data component is transmitted from the contact center through the data circuit to the remote terminal, responding to the customer call, wherein the step of responding includes answering the voice component with the remote telephone through the telephone circuit and answering the data component with the remote terminal through the data circuit and logging the remote terminal off of the contact center.

This further embodiment of the present invention also includes providing a phone number to direct the transmission of the voice component of the customer call from the contact center to the remote telephone when the remote terminal logs into the contact center. The telephone circuit is a public switched telephone network. The data circuit can be a high speed internet connection or a high speed wireless internet connection.

The contact center of this further embodiment of the present invention also includes at least one gateway coupled to the telephone circuit wherein the telephone circuit is a public switched telephone network, and further coupled to at least one hub, at least one network coupling the at least one node to the at least one hub and a plurality of agent terminals coupled to the at least one node. The at least one gateway receives the customer call from the public switched telephone network and distributes the customer call to one of the at least one nodes. The at least one node separates the voice component and the data component of the customer call, and further wherein the at least one node sends the voice component to the at least one gateway and the data component through the at least one network to a remote data access device. The at least one network can be a wide area network or a local area network.

A further embodiment of the present invention includes a system for providing high quality of service remote access to a voice over internet protocol contact center comprising means for logging a remote terminal into a contact center through a data circuit, means for transmitting a voice component of a customer call from the contact center to a remote telephone through a telephone circuit, means for transmitting a data component of the customer call corresponding to the voice component, wherein the data component is transmitted from the contact center through the data circuit to the remote terminal, means for responding to the customer call, wherein the responding means includes means for answering the voice component with the remote telephone through the telephone circuit and means for answering the data component with the remote terminal through the data circuit and means for logging the remote terminal off of the contact center.

This further embodiment also includes means for providing a phone number to direct the transmission of the voice component of the customer call from the contact center to the remote telephone when the remote terminal logs into the contact center. The telephone circuit is a public switched telephone network. The data circuit can be a high speed internet connection or a high speed wireless internet connection.

The contact center of this further embodiment also includes at least one gateway coupled to the telephone circuit wherein the telephone circuit is a public switched telephone network, and further coupled to at least one hub, at least one network coupling the at least one node to the at least one hub and a plurality of agent terminals coupled to the at least one node. The at least one gateway receives the customer call from the public switched telephone network and distributes the customer call to one of the at least one nodes. The at least one node separates the voice component and the data component of the customer call, and further wherein the at least one node sends the voice component to the at least one gateway and the data component through the at least one network to a remote data access device. The at least one network can be a wide area network or a local area network.

A further embodiment of the present invention includes a system for providing remote access to a VoIP contact center to a user having a data apparatus and a separate telephone, the system comprising a contact center including a remote data access device configured to couple to the data apparatus through a data circuit and a telephone control circuit coupled under control of the contact center to initiate a telephone call with the separate telephone.

Still a further embodiment of the present invention of the present invention includes a method of providing remote access to a VoIP contact center to a user having a data apparatus and a separate telephone, the system comprising coupling from a contact center including a remote data access device to the data apparatus through a data circuit and controlling the contact center to initiate a telephone call with the separate telephone.

DETAILED DESCRIPTION OF THE PREFERRED EMBODIMENT

Figure 2:
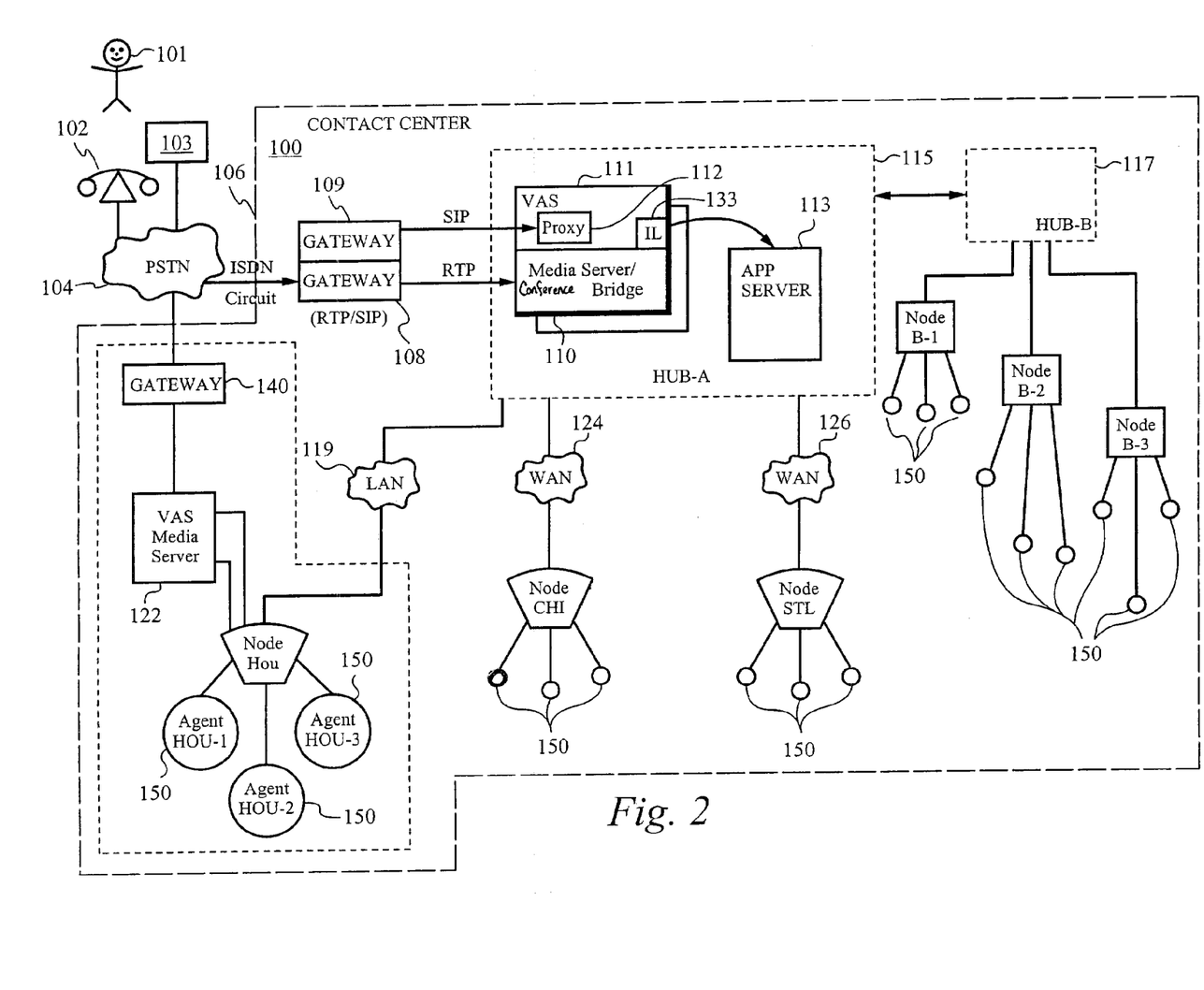
FIG. 2 illustrates a graphical representation of a Contact Center architecture of the preferred embodiment of the present invention.

FIG. 2 depicts a Contact Center 100 able to implement the preferred embodiment of the present invention. The Contact Center 100 connected to the Public Switched Telephone Network (PSTN) 104 contains a high QoS. The Contact Center 100 has a "Hub and Node" architecture including a number of Hubs 115, 117, and each Hub 115 having corresponding Nodes (Node CHI, Node STL) where Agents 150 answer customer calls in a high QoS environment.

The present system and method address the problems that occur when an Agent 150 takes customer calls while not in the high QoS environment provided by the Contact Center 100. In other words, the present system and method address the QoS problems associated with remote Agent 150 access to the Contact Center 100. The details concerning the Contact Center 100 are disclosed in a co-filed, co-owned and co-pending U.S. Provisional Patent Application Ser. No. 60/435,974, entitled "YOSEMITE ARCHITECTURE SPECIFICATION II." The U.S. Provisional Patent Application Ser. No. 60/435,974, entitled "YOSEMITE ARCHITECTURE SPECIFICATION II" is also incorporated by reference in its entirety. Of course, it will be readily apparent to one skilled in the art that in alternative embodiments of the present invention disclosed in the following specification can and will be utilized in VoIP networks other than the Contact Center 100 incorporated by reference above.

Figure 3:
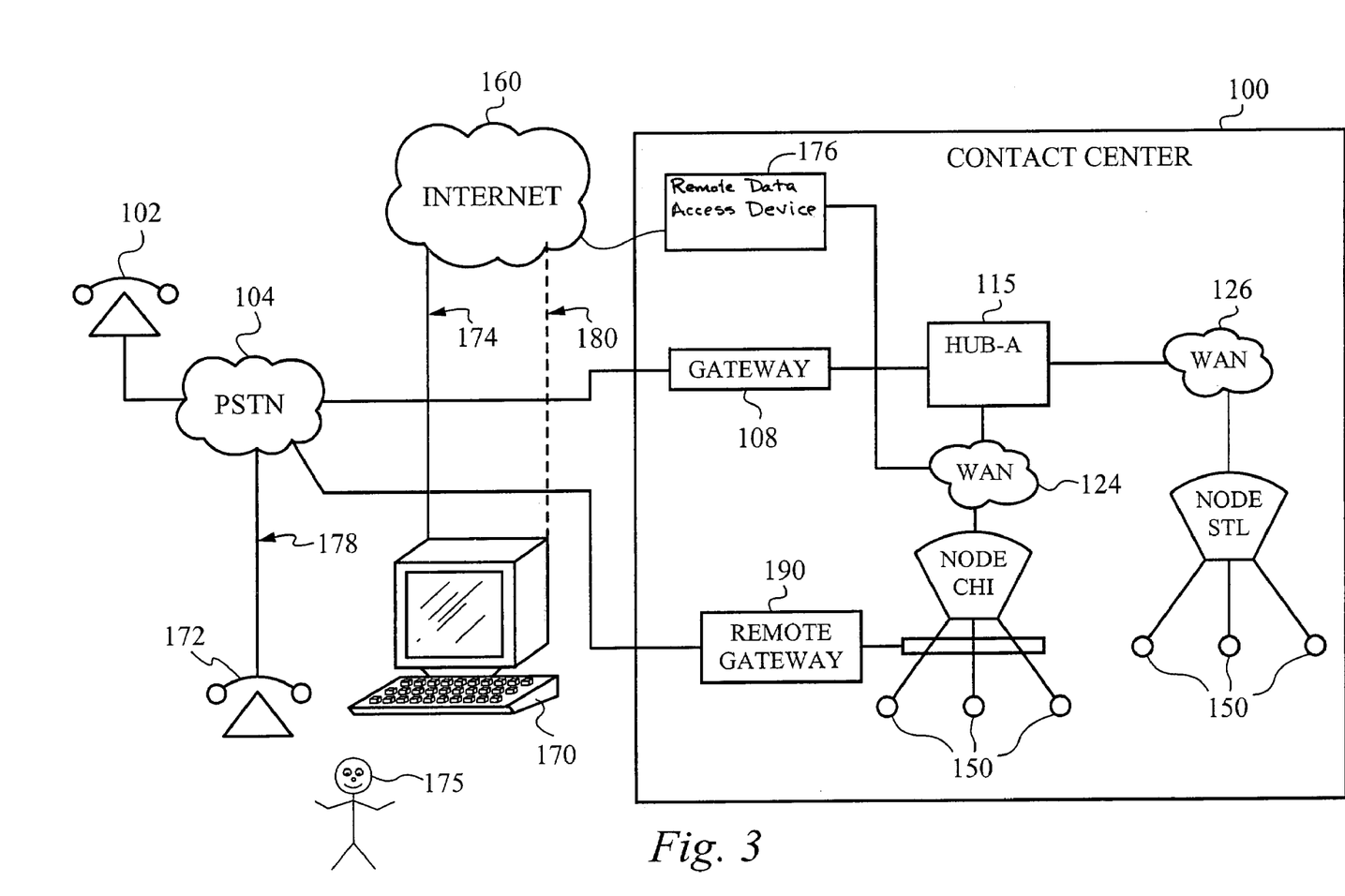
FIG. 3 illustrates a graphical representation of remote agent access to a Contact Center of the preferred embodiment of the present invention.

FIG. 3 describes a system and method to interface a remote Agent 175 to a VoIP Contact Center where the Agent 175 does not have economically viable access to the high QoS digital network provided in the Contact Center 100. For illustrative purposes, the Contact Center 100 in FIG. 3 is a simplified version of the Contact Center 100 in FIG. 2. As detailed in the application incorporated by reference, it should be understood that a Contact Center 100 of the present invention can include any number of Hubs 115, Nodes (Node CHI, Node STL), Agents 150 and Gateways 108, depending on the specific needs of the Contact Center 100.

Still referring to FIG. 3, the system and method of the present invention includes splitting the voice and data traffic apart and carrying the CRM Application data from the Remote Terminal 170 on regular Data Circuits 174 such as DSL or Broadband Cable using VPN Software and a remote data access device 176 to access the Contact Center 100 over the internet, while moving the Agent's 175 voice component back through a Phone Line 178, to the PSTN 104 and into a Remote Gateway 190. The Remote Gateway 190 is connected to the WAN 124 or a LAN depending on the particular node. This is accomplished by taking the VoIP voice component called the Real Time Protocol (RTP) data stream that would normally go to the Agent's 175 softphone in the Remote Terminal 170 or IP hardphone (in a non-remote configuration such as that of an Agent 150 in FIG. 2) and redirect it back to the Remote Gateway 190 that can make phone calls on the PSTN 104.

When the Agent 175 logs into the Contact Center 100 through the remote data access device 176, the Agent 175 can indicate that he or she is operating remotely and specify the phone number of the Phone Line 178. This number would then be called by the Gateway 108 and all RTP traffic normally headed for the Agent's 175 softphone or hardphone will go to the Gateway 108 and then through the PSTN 104 to the remote Agent 175 via the Phone Line 178 and the Phone 172. In a preferred embodiment, this call would remain connected until the Agent logged out at the end of an Agent's work shift, and all the various call controls, both audible on the Phone 172 and/or audible and visual controls on the Agent's 175 Remote Terminal 170 desktop would control the beginning and end of calls. However, an alternative embodiment may include the Remote Gateway 108 calling the Agent 175 through the PSTN 104 and Phone Line 178 and disconnecting for each and every call, thereby initiating a new call for every customer call.

Also in the preferred embodiment of the present invention, the operation of the remote Agent 175 access of FIG. 3 will include the Agent 175 logging into the Contact Center 100 through the remote data access device 176 as described above. However, in instances when a Remote Gateway 190 exists, i.e., the Agent 175 is logging into a Node (such as NODE CHI in FIG. 3) that is within a local phone call range of the Agent 175, the Node will connect to the PSTN through the Remote Gateway 190. This ability to connect remotely to local nodes is able to save the Contact Center 100 administrator money while reducing traffic in the hub (HUB-A).

The data portion of the communication between the Agent 175 and the Contact Center 100 to provide the client side of the CRM Application and to operate the Contact Center 100 call handling can be covered by consumer grade high speed access to the Internet 160 at relatively low prices.

The system and method described in FIG. 3 make it possible for the Agent 175 to operate from anywhere a Data Circuit 174 and an Analog Phone Line 178 exist. Obviously one example would be an Agent 175 who works from home, but a more interesting one would be an Agent 175 who has a wireless network enabled PC and happens to be somewhere they can access both an Analog Phone Line 178 and a wireless network having a Wireless Data Circuit 180 to the Internet 160. In this scenario, an Agent 175 at an airport could connect to the Contact Center 100 by going to one of the wireless access points at the airport that also has a telephone, such as an airline club lounge.

Referring again to FIG. 3, the preferred embodiment of the present invention includes the Contact Center 100 incorporated by reference previously in this document. As stated earlier, FIG. 3 depicts a simplified version of the Contact Center 100 incorporated by reference for simplicity of description. However, it should also be noted that further embodiments may include Contact Center 100 architectures that differ from that of the preferred embodiment as depicted in FIG. 2 and FIG. 3 as the present invention of a system and method of providing high QoS to a remote Agent 175 may also be applied to other Contact Center 100 topologies.

In the preferred embodiment of the present invention, the Contact Center 100 includes, in addition to the Hub and Node topology incorporated by reference, a remote data access device 176 such as, but not limited to, a Virtual Private Network (VPN) Device and a Remote Gateway 190. The remote data access device 176 is coupled to the Internet 160. An Agent 175, working remotely from a Remote Terminal 170 having VPN Software compatible with the remote data access device 176, logs into the Contact Center 100. The Remote Terminal 170 is coupled to the Internet 160 with a high speed connection including a Data Circuit 174 such as DSL or Broadband Cable, or a high-speed Wireless Data Circuit 180. Such a connection allows an Agent 175 to access the Contact Center 100 via the remote data access device 176.

After the Agent 175 accesses the remote data access device 176, the Agent 175 logs into the particular Node (NODE CHI, NODE STL) to which they would normally be connected when they are not working remotely, but rather as an in-house Agent 150. For illustrative purposes, the Agent 175 logs into the Node (NODE CHI) through the remote data access device 176 via a Data Circuit 174 connection to the Internet 160. After the Agent 175 has logged in by providing the Node (NODE CHI) with the telephone number of the Remote Telephone 172 the Agent 175 will be using to conduct customer calls from, the Remote Gateway 190 will call the Remote Telephone 172 through the PSTN 104. Once the Agent 175 answers the call, the Remote Gateway 190 will send the Agent 175 a customer call and the Node (NODE CHI) will simultaneously send the Agent 175 the data for that particular customer via the Internet 160 connection to the Agent's 175 Remote Terminal 170. Alternatively, the Gateway 108 will send the Agent 175 a customer call and the Node (NODE CHI) will simultaneously send the Agent 175 the data for that particular customer via the Internet 160 connect. It should be understood that both the Remote Gateway 190 and any other Gateway 108, may initiate the call to the Agent 175 in further embodiments of the present invention.

In a preferred embodiment, the Remote Gateway 190 only makes one call to the Remote Telephone 172, allowing the Agent 175 to serially answer multiple customer calls on one long phone call from the Contact Center 100 in an "always connected" mode. Alternatively, the Agent 175 may disconnect the call from the Remote Gateway 190 (or Gateway 108) after every customer call, thereby requiring the Remote Gateway 190 to make a separate call to the Remote Telephone 172 for every customer call received in the Node (NODE CHI) from the PSTN 104 in a "connect on demand" mode. This is possible because all the Agent's 175 call signaling is controlled through the graphical user interface of the Agent's 175 Remote Terminal 170. While these calls may be initiated by the Agent 175, it is preferable that the Contact Center 100 call out to the Agent 175 in both the "always connected" mode and the "connect on demand" mode, as corporate calling plans will typically allow a less expensive cost for phone connection, and will group billing costs together for the corporation to pay on a single bill, as opposed to employees creating expense reports for any monetary phone usage charges.

Referring still to FIG. 3, when the Agent 175 is done with his or her shift or cannot stay remotely connected, the Agent 175 logs out of the Contact Center 100 through the Remote Terminal 170 and hangs up the current call on the Remote Telephone 172. The Agent 175 prevents additional calls from the Remote Gateway 190 or Gateway 108 by logging out of the Contact Center 100.

Figure 4:
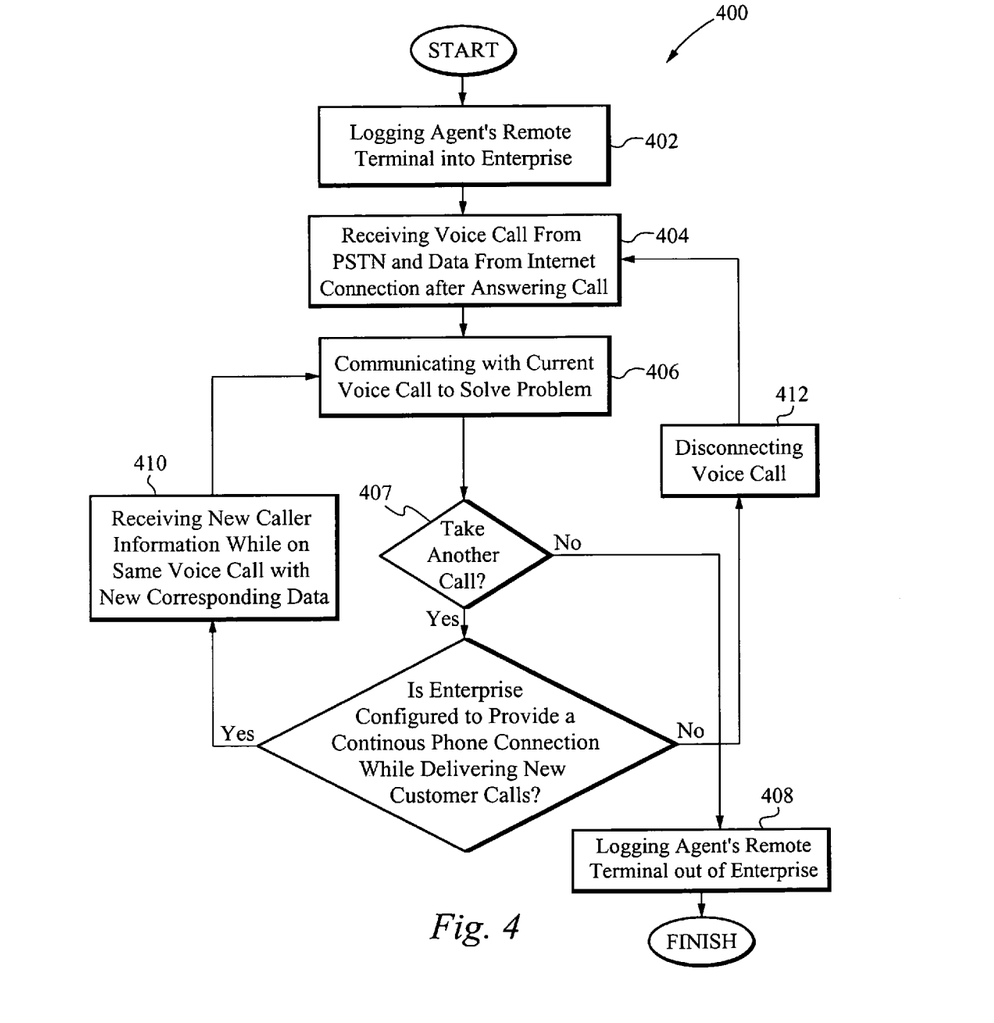
FIG. 4 illustrates a flow chart representation of the preferred embodiment of the present invention.

A method of the preferred embodiment of the present invention is depicted in FIG. 4. A remote agent initiates a customer call session 400 by logging a remote terminal into the Contact Center in Step 402. The agent then receives a voice call from a PSTN connection to the Contact Center, and corresponding data form the internet connection to the enterprise in Step 404. The agent then communicates with the customer to answer that customer's questions, solve a particular problem, etc., in Step 406. After the agent completes a call, the agent must decide whether he or she would like to take another call in Step 407. If not, the agent's remote terminal is logged out of the enterprise and the customer call session 400 is completed in Step 408.

Still referring to FIG. 4, if the agent does wish to take another customer call, in the preferred embodiment of the present invention, the enterprise is configured to provide multiple calls over one continuous phone connection. In this case, the agent will receive another voice call and corresponding data in Step 410. Again, these two components will be received just as in Step 404. After receiving the new customer call, the agent will again communicate with the caller in Step 406. Alternatively, if the enterprise is not configured to provide a continuous phone connection for multiple customer calls, the current customer call will be disconnected in Step 412 and a new customer call will be initiated by a new and separate phone call to the agent in Step 404.

The present invention has been described in terms of specific embodiments incorporating details to facilitate the understanding of the principles of construction and operation of the invention. Such reference herein to specific embodiments and details thereof is not intended to limit the scope of the claims appended hereto. For example, the system and method of remote agent access may be applied to a Contact Center other than that of the preferred embodiment. It will be apparent to those skilled in the art that modifications can be made in the embodiment chosen for illustration without departing from the spirit and scope of the invention.

What is claimed is:

1. A system for providing high quality of service remote access to a voice over internet protocol contact center, comprising:
   a. a contact center which splits an incoming call having both data and VOIP voice into a data component and a voice component, wherein the contact center includes a remote data access device for controlling the data component of the incoming call, at least one gateway for controlling the voice component of the incoming call and for converting the VoIP voice for transmission via a PSTN voice network forming a converted voice component, and at least one node coupled to the at least one gateway;
   b. a remote terminal coupled with the remote data access device through a data circuit; and
   c. a remote telephone coupled with the at least one gateway through a telephone circuit,
      wherein when an agent logs the remote terminal into the contact center, the converted voice component of a customer call is transmitted from the gateway to the remote telephone via the PSTN voice network and the data component of the customer call is transmitted from the contact center to the remote terminal via a data network and further wherein when the remote terminal logs into the contact center, the remote terminal provides a phone number to direct the transmission of the converted voice component of the customer call from the at least one gateway to the remote telephone.

2. The system as claimed in claim 1 wherein the agent can respond to the customer call using the remote telephone and the remote terminal.

3. The system as claimed in claim 1 wherein the data circuit is a high speed internet connection.

4. The system as claimed in claim 1 wherein the data circuit is a high speed wireless internet connection.

5. The system as claimed in claim 1 wherein the remote data access device is a VPN device.

6. The system as claimed in claim 1 wherein the contact center further includes:
   a. at least one hub coupled to the telephone circuit through the at least one gateway;
   b. at least one network coupling the at least one node to the at least one hub; and c. a plurality of agent terminals coupled to the at least one node.

7. The system as claimed in claim 6 wherein the at least one gateway receives the customer call from the public switched telephone network and distributes the customer call to one of the at least one nodes.

8. The system as claimed in claim 7 wherein the at least one node separates the converted voice component and the data component of the customer call, and further wherein the at least one node sends the converted voice component to the at least one gateway and the data component through the at least one network to the remote data access device.

9. The system as claimed in claim 6 wherein the at least one network is a wide area network.

10. The system as claimed in claim 6 wherein the at least one network is a local area network.

11. A method of providing high quality of service remote access to a voice over interact protocol contact center, comprising the steps of:
   a. logging a remote terminal into a contact center through a data circuit;
   b. splitting a customer call having both data and voice into a data component and a VoIP voice component;
   c. converting the VoIP voice for transmission via a PSTN voice network forming a converted voice component and then transmitting the converted voice component of the customer call from the contact center to a remote telephone through a telephone circuit;
   d. transmitting the data component of the customer call corresponding to the voice component, wherein the data component is transmitted from the contact center through the data circuit to the remote terminal;
   e. responding to the customer call, wherein the step of responding includes answering the converted voice component with the remote telephone through the telephone circuit and answering the data component with the remote terminal through the data circuit;
   f. logging the remote terminal off of the contact center; and
   g. providing a phone number to direct the transmission of the converted voice component of the customer call from the contact center to the remote telephone when the remote terminal logs into the contact center.

12. The method as claimed in claim 11 wherein the data circuit is a high speed internet connection.

13. The method as claimed in claim 11 wherein the data circuit is a high speed wireless internet connection.

14. The method as claimed in claim 11 wherein the contact center further includes:
   a. at least one gateway coupled to the telephone circuit, and further coupled to at least one hub;
   b. at least one network coupling the at least one node to the at least one hub; and
   c. a plurality of agent terminals coupled to the at least one node.

15. The method as claimed in claim 14 wherein the at least one gateway receives the customer call from the public switched telephone network and distributes the customer call to one of the at least one nodes.

16. The method as claimed in claim 15 wherein the at least one node separates the converted voice component and the data component of the customer call, and further wherein the at least one node sends the converted voice component to the at least one gateway and the data component through the at least one network to a remote data access device.

17. The method as claimed in claim 14 wherein the at least one network is a wide area network.

18. The method as claimed in claim 14 wherein the at least one network is a local area network.

19. A system for providing high quality of service remote access to a voice over internet protocol contact center, comprising:
   a. means for logging a remote terminal into a contact center through a data circuit;
   b. means for splitting a customer call having both data and VoIP voice into a data component and a voice component and for converting the VoIP voice for transmission via a PSTN voice network forming a converted voice component;
   c. means for transmitting the converted voice component of the customer call from the contact center to a remote telephone through a telephone circuit;
   d. means for transmitting the data component of the customer call corresponding to the voice component, wherein the data component is transmitted from the contact center through the data circuit to the remote terminal;
   e. means for responding to the customer call, wherein the responding means includes means for answering the converted voice component with the remote telephone through the telephone circuit and means for answering the data component with the remote terminal through the data circuit;
   f. means for logging the remote terminal off of the contact center; and
   g. means for providing a phone number to direct the transmission of the converted voice component of the customer call from the contact center to the remote telephone when the remote terminal logs into the contact center.

20. The system as claimed in claim 19 wherein the data circuit is a high speed internet connection.

21. The system as claimed in claim 19 wherein the data circuit is a high speed wireless internet connection.

22. The system as claimed in claim 19 wherein the contact center further includes:
   a. at least one gateway coupled to the telephone circuit, and further coupled to at least hub;
   b. at least one network coupling the at least one node to the at least one hub; and
   c. a plurality of agent terminals coupled to the at least one node.

23. The system as claimed in claim 22 wherein the plurality of gateways receives the customer call from the public switched telephone network and distributes the customer call to one of the at least one nodes.

24. The system as claimed in claim 23 wherein the at least one node separates the converted voice component and the data component of the customer call, and further wherein the at least one node sends the converted voice component to the at least one gateway and the data component through the at least one network to a remote data access device.

25. The system as claimed in claim 22 wherein the at least one network is a wide area network.

26. The system as claimed in claim 22 wherein the at least one network is a local area network.

27. A system for providing remote access to a VoIP contact center to a user having a data apparatus and a separate telephone for processing a customer call with both data component and a voice component, the system comprising:
  a. means for splitting the customer call into voice and data and for converting the VoIP voice for transmission via a PSTN voice network forming a converted voice component;
  b. a contact center including a remote data access device configured to couple data component to the data apparatus through a data circuit; and
  c. a telephone control circuit coupled under control of the contact center to initiate a telephone call for the converted voice component with the separate telephone without transmitting the call through the remote data access device wherein when the data apparatus logs into the contact center, the data apparatus provides a phone number to direct the transmission of the converted voice component of the customer call to the separate telephone.

28. A method of providing remote access to a VoIP contact center to a user having a data apparatus and a separate telephone for processing a customer call with both a data component and a voice component, the system comprising:
  a. splitting the customer call into the voice component and the data component and for converting the VoIP voice for transmission via a PSTN voice network forming a converted voice component;
  b. coupling the data component from a contact center including a remote data access device to the data apparatus through a data circuit; and
  c. controlling the contact center to initiate a telephone call for the converted voice component with the separate telephone without transmitting the call through the remote data access device wherein when the data apparatus logs into the contact center, the data apparatus provides a phone number to direct the transmission the transmission of the converted voice component of the customer call to the separate telephone.

* * * * *

UNITED STATES PATENT AND TRADEMARK OFFICE
CERTIFICATE OF CORRECTION

| | | |
|---|---|---|
| PATENT NO. | : 7,230,946 B2 | Page 1 of 1 |
| APPLICATION NO. | : 10/327360 | |
| DATED | : June 12, 2007 | |
| INVENTOR(S) | : Carl Schoeneberger | |

It is certified that error appears in the above-identified patent and that said Letters Patent is hereby corrected as shown below:

In the Claims

Column 8, Line 41

Delete "thc" and replace with --the--.

Signed and Sealed this

Twenty-fourth Day of July, 2007

JON W. DUDAS
*Director of the United States Patent and Trademark Office*